Nov. 1, 1960 — V. E. LONG — 2,958,843
STATIC GROUNDING CONNECTION
Filed Dec. 18, 1956
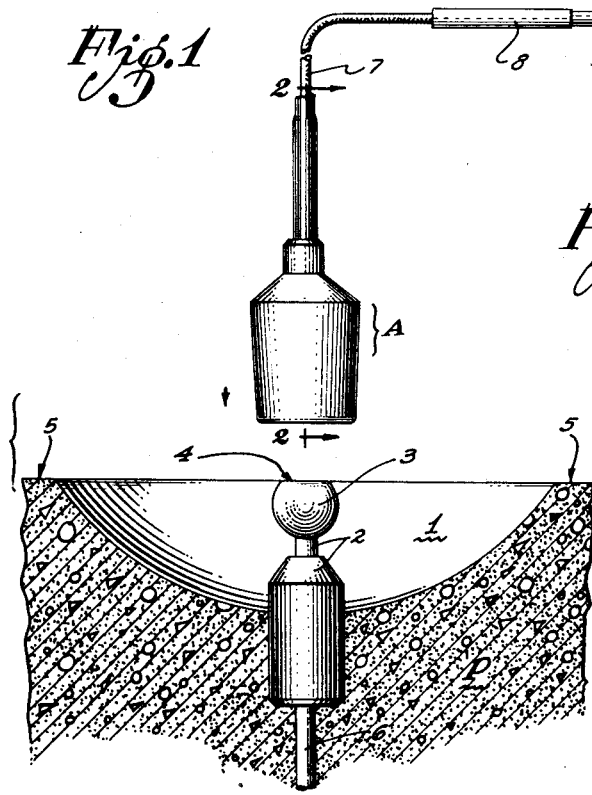
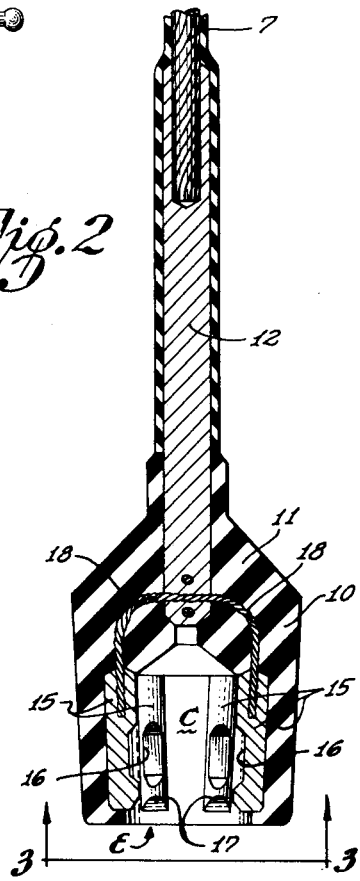
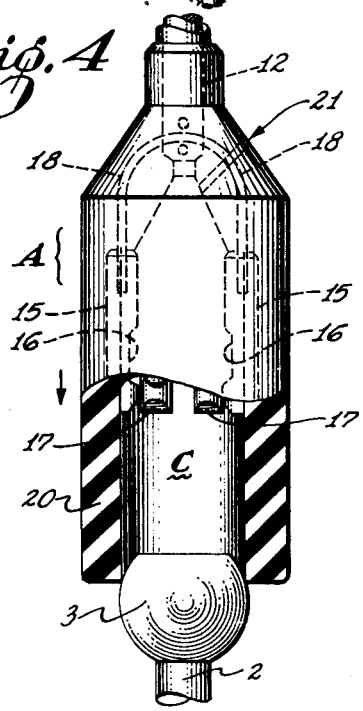
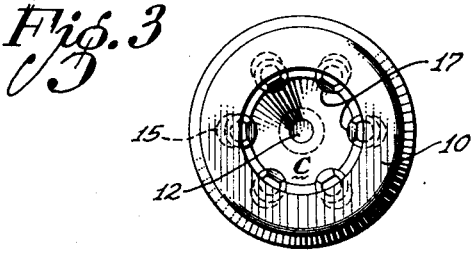
INVENTOR:
Veron E. Long
By Hubert E. Metcalf
His Patent Attorney United States Patent Office 2,958,843
Patented Nov. 1, 1960

2,958,843

STATIC GROUNDING CONNECTION

Veron E. Long, Lancaster, Calif., assignor to Northrop Corporation, a corporation of California Filed Dec. 18, 1956, Ser. No. 629,063

4 Claims. (Cl. 339—61)

My invention relates to grounding connectors and more particularly to a grounding connector and system suited for use in the static grounding of aircraft during a fuelling operation for example.

In grounding aircraft during a fuelling operation, a ground wire is attached to the aircraft and extended to an adjacent grounded conductor in the airport surface, the latter connection customarily being made by the well known alligator jaw clip.

Alligator jaw clip teeth do not insure a positive, reliable, low resistance electrical connection to the ground rod. If accidentally left connected when the aircraft taxis away, the clip connection may hang on and cause various amounts of damage. One of the main faults however, is that when said clips are left on the airport runway surface and are run over by fuelling trucks, aircraft, or other vehicles, they are very susceptible to damage and may be found inoperative just when grounding is desired prior to refuelling. This can cause either a delay or a hurried, totally improper and poor ground connection.

It is an object of the invention to provide a ground connector for a grounding rod which greatly reduces or eliminates the faults of the alligator jaw clip. Furthermore, as the purpose of a ground wire is to drain static electricity from the aircraft to ground, sparks can occur when the clip is attached to the ground rod, thereby creating a fire hazard.

Briefly, my invention in one aspect comprises a connector having a hollow rubber-like body open at one end with separate internal conductive fingers, these fingers each being flexibly connected to a single main conductor within the other end of the body. The fingers are arranged to grip and connect to a grounded ball in an airport surface, for example, when the body and fingers are forced over the ball. A positive connection is made, and most important, the elastic body with its flexibly connected fingers can be left on the runway and run over by the usual runway vehicles without damage, the connector regaining its original operative shape after flattening.

Other objects and advantages of my invention will be apparent from the ensuing description of the drawings in which:

Figure 1 is a diagrammatic view of a ball-end grounded stud, connector and grounding cable as suitable for use at an airport.

Figure 2 is a longitudinal sectional view of the connector of Figure 1.

Figure 3 is an end view, in elevation, as indicated by the line 3—3 in Figure 2.

Figure 4 is a longitudinal view, partly cut-away, of an ignition proof connector.

Referring first to Figure 1, a paving material P, such as a cement or asphalt airport covering, is provided with a bowl-shaped depression 1 in the center of which a stud 2 projects upwardly terminating in a ball-shaped end 3. This ball-end stud has a flat upper surface 4 preferably at the same level as surface 5 of the paving material P, but the end 3 may terminate lower if desired. In any event the width of the bowl 1 taken together with the central support of the stud and ball should not be great enough to substantially interfere with tire and wheel passage thereover. Using a one inch ball, the depression may be about 6 inches in diameter.

Stud 2 is attached to a grounding rod 6 driven into conductive earth below paving P.

The grounding stud just above described is utilized by forcing thereon a connector assembly A, to be later described in detail, this connector assembly being attached to a grounding cable 7 extending to a terminal plug 8 for insertion into the conventional aircraft receptacle connected to the bonded frame of the aircraft.

As the connector assembly A has many advantages over the conventional alligator clip, it will be described in detail as shown in Figures 2 and 3.

A body 10 is made, preferably molded, from rubber or synthetic rubber to be elastic, deformable and tough. Body 10 is hollow and generally cylindrical; open at one end at E and closed at the other end by end portion 11 and a rod fitting 12 which extends outwardly and into which the grounding cable 7 is swaged, bonded or welded.

A plurality of contact fingers 15 are arranged around center space C of the body 10 and are embedded in the inner wall of the body, and are bonded to the body material by processes well known in the art so that the body material will tear before the fingers will separate from the body.

Each finger 15 is provided with a cutaway portion 16 facing the interior space C of the body thereby providing shoulders 17 adjacent the end opening E of the body 10. Each finger 15 is connected to rod fitting 12 by a flexible connection 18 preferably totally embedded in the body material.

In a practical example of the connector as just above described, for use in conjunction with a stud end ball one inch in diameter, the body 10 was made from a synthetic rubber "chloroprene" molded into the shape shown in Figure 2. The circle described by the inner surfaces of the finger shoulders 17 is less than one inch as for example by one tenth of an inch. Ball-end 3 and fingers 15 were made from stainless steel, and cable 7 and flexible connections 18 were formed from stranded beryllium copper.

In operation the ball end 3 is placed at the opening of body 10 and the finger shoulders 17 forced to ride over the ball, this action being permitted by the stretch of the rubber, the ball thereafter being gripped by the fingers 15. The connector can be easily removed and replaced at any time, will not hang up, and can assume various angular relationships to the ball as required. Note also that each finger makes independent contact on the order of 2–3 ohms, well below the usual requirement of 10 ohms or less. A Shore hardness of 45 to 55 has been found satisfactory for the rubber body material.

To insure uniform flexibility of the entire connector, the flexible connections 18 should not be significantly less flexible than the body material.

The connector as above described may be left on the airport paving and run over by airport vehicles in normal traffic without significant damage sufficient to prevent future proper operation.

While I have described my invention as preferably using a plurality of fingers 15, a single finger can be used, with the ball bearing against the interior wall of the body on one side, and the one finger on the other side of the body.

In Figure 4 I have shown a modification designed to prevent static sparks from igniting spilled fuel or other combustible volatile materials in or adjacent the airport surface. In this modification, the ball-end 3 of the stud completely seals the open end of the connector before finger contact is made. This is done by elongating the center space C beyond the finger shoulder 17 to form a conductor free skirt 20 having a diameter slightly less than that of the ball 3. Thus when the ball-end 3 is inserted into skirt 20, the open end of the body is completely sealed before finger contact is made. Thus any spark created just prior to contact cannot ignite vapors or fuel outside the connector. In order that ball-end 3 can readily be inserted into the body 10 a small air vent 21 is provided between the interior and exterior of the body. This vent is made small in diameter to suppress flame exit, in the exceedingly remote possibility that a spark might ignite gas inside the connector.

While I have described my invention as particularly useful for grounding aircraft it is of course equally valuable in grounding any piece of apparatus where quick detachment of the ground connection is desired.

While in order to comply with the statute, the invention has been described in language more or less specific as to structural features it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

I claim:

1. A safety ground connector comprising a generally cylindrical hollow body of elastic, distortable, rubber-like material, a plurality of elongated individual rigid connecting fingers arranged around the interior of said body, attached to and partially embedded in the inner wall of said body, and exposed only to said interior, a closure for one end of said body, an electrical conductor extending outwardly through said closure, flexible electrical connectors embedded in said body and connecting each of said fingers to said electrical conductor, the other end of said body being open to permit insertion of a ball into said body to contact and ride on said fingers, the circle described by the inner surfaces of said fingers being less in diameter than the diameter of the ball to be connected therein, whereby said ball is gripped by said fingers due to the elasticity of said body.

2. A safety ground connector comprising a generally cylindrical hollow body of elastic, distortable, rubber-like material, a plurality of individual elongated rigid connecting fingers arranged around the interior of said body, attached to and partially embedded in the inner wall of said body, and exposed only to said interior, a closure for one end of said body, an electrical conductor extending outwardly through said closure, flexible electrical connectors embedded in said body and connecting each of said fingers to said electrical conductor, the other end of said body being open to permit insertion of a ball into said body to contact and ride on said fingers, the circle described by the inner surfaces of said fingers being less in diameter than the diameter of the ball to be connected therein, whereby said ball is gripped by said fingers due to the elasticity of said body, said fingers having outer end portions describing a circle of still less diameter and shaped to pass around the diameter of said ball to retain said ball in said body when said ball is inserted between said fingers beyond said end portions.

3. A safety ground connector comprising a generally cylindrical hollow body of elastic, distortable, rubber-like material, a plurality of elongated individual rigid connecting fingers arranged around the interior of said body, attached to and partially embedded in the inner wall of said body, and exposed only to said interior, a closure for one end of said body, an electrical conductor extending outwardly through said closure, flexible electrical connectors embedded in said body and connecting each of said fingers to said electrical conductor, the other end of said body being open to permit insertion of a ball into said body to contact and ride on said fingers, the circle described by the inner surfaces of said fingers being less in diameter than the diameter of the ball to be connected therein, whereby said ball is gripped by said fingers due to the elasticity of said body, said body having a skirt portion extending a distance beyond the end of said fingers at the open end of said body, the inner diameter of said latter body portion being slightly less than the diameter of said ball whereby the insertion end of said body is sealed by said ball prior to any contact of said ball with said fingers, said body having means defining a vent passage through said closure between the interior and exterior thereof, said passage being small enough in effective diameter to suppress flame exit.

4. A safety ground connector comprising a generally cylindrical hollow body of elastic, distortable, rubber-like material, elongated individual rigid connecting fingers arranged around the interior of said body, attached to and partially embedded in the inner wall of said body and exposed only to said interior, a closure for one end of said body, an electrical conductor extending outwardly through said closure, flexible electrical connectors embedded in said body and connecting each of said fingers to said electrical conductor, the other end of said body being open to permit insertion of a ball into said body to contact said fingers, the circle described by the inner surfaces of said fingers being less in diameter than the diameter of the ball to be connected therein, whereby said ball is gripped by said fingers due to the elasticity of said body, the flexibility of said electrical connectors being about the same or greater than the flexibility of said body.

References Cited in the file of this patent

UNITED STATES PATENTS

| | | |
|---|---|---|
| 1,394,426 | Wade | Oct. 18, 1921 |
| 1,520,485 | Singleton | Dec. 23, 1924 |
| 2,192,943 | Sumner | Mar. 12, 1940 |
| 2,221,280 | Woodside | Nov. 12, 1940 |
| 2,307,592 | Kuhlman | Jan. 5, 1943 |
| 2,319,122 | Funk | May 11, 1943 |
| 2,690,541 | Elliott | Sept. 28, 1954 |
| 2,719,956 | Leighton | Oct. 4, 1955 |
| 2,724,092 | Simpkins | Nov. 15, 1955 |

FOREIGN PATENTS

| | | |
|---|---|---|
| 774,220 | Great Britain | May 8, 1957 |